United States Patent [19]

Inoue

[11] 3,994,790

[45] Nov. 30, 1976

[54] METHOD OF TREATING A WASTE GAS

[75] Inventor: Kiyoshi Inoue, Tokyo, Japan

[73] Assignee: Inoue-Japax Research Inc., Yokohama, Japan

[22] Filed: Feb. 13, 1975

[21] Appl. No.: 549,762

[30] Foreign Application Priority Data

Feb. 15, 1974 Japan............................. 49-18830
Feb. 21, 1974 Japan............................. 49-21678

[52] U.S. Cl.............................. 204/130; 204/131; 204/129.1; 204/129.75; 204/101
[51] Int. Cl.²................... C25B 1/00; C25B 3/00
[58] Field of Search............ 204/130, 129.1, 129.5, 204/129.6, 129.7, 129.75, 129.85, 131, 101

[56] References Cited
UNITED STATES PATENTS

| | | | |
|---|---|---|---|
| 1,034,646 | 8/1912 | Rabenalt........................... | 204/130 |
| 3,284,327 | 11/1966 | Maeda et al..................... | 204/129.1 |
| 3,824,163 | 7/1974 | Maget............................... | 204/130 |
| 3,896,012 | 7/1975 | Buschbaum et al............ | 204/129.1 |

*Primary Examiner*—R. L. Andrews
*Attorney, Agent, or Firm*—Karl F. Ross; Herbert Dubno

[57] ABSTRACT

A method of removing a toxic component from a gas, comprising mixing the gas with an electrolyte and passing the mixture of gas and liquid electrolyte through a narrow gap between a pair of electrodes across which an electric field is applied to induce electrochemical reaction between the gas and the electrolyte.

10 Claims, 3 Drawing Figures

METHOD OF TREATING A WASTE GAS

FIELD OF THE INVENTION

The present invention relates to anti-pollution apparatus techniques and, more particularly, to a method of an apparatus for treating a waste gas containing a noxious component, i.e. exhaust gases from industrial plants, workshops or combustion sites, or gaseous effluents containing toxic or odoriferous contaminants, with the aid of electrical energy, utilizing electrochemical action.

BACKGROUND OF THE INVENTION

In the past, the treatment of waste gases has been carried out by contacting a stream of the waste gas either with catalytic bodies or absorbing liquid or other reactive fluids to remove contaminant components from the gas stream by oxidation, reduction, contact adsorption and/or absorption processes. These known systems are characterized by deficiencies such as excessive size of the installation, relatively high costs of operation, and inability to remove contaminants to the extent desired. Furthermore, the problem of secondary pollution must most often be considered.

OBJECTS OF THE INVENTION

It is, therefore, a principal object of the present invention to provide an improved method of treating waste gases whereby the disadvantages of the earlier systems are eliminated or alleviated.

Another object of the invention is to provide a high-efficiency gas treatment method which enables reliable and yet economical contaminant removal operations.

A further object of the invention is to provide a method which allows the use of an apparatus more compact than earlier apparatus, which has a higher treatment capability and efficiency than existing systems and which is relatively low in operational cost.

SUMMARY OF THE INVENTION

In accordance with the present invention, there is provided a method of treating a waste gas containing a noxious component comprising the steps of injecting the gas into a stream of liquid electrolyte, rapidly passing the liquid entraining therein the gas in the form of minute bubbles through a narrow gap between a pair of electrodes while passing an electric current between said electrodes to effect an electrochemical reaction between said noxious component in the gas bubbles and the liquid electrolyte in contact therewith thereby detoxifying said gas and venting the detoxified gas to the atmosphere.

The apparatus for carrying out the method comprises a treatment vessel, a pair of closely spaced-apart electrodes received in said vessel, means for supplying under pressure a stream of liquid electrolyte into the narrow gap between said electrodes, means for injecting the waste gas into the electrolyte stream prior to its entry to said gap, means for passing an electric current between said electrodes across said stream of the liquid electrolyte entraining the gas to permit an electrochemical reaction between the noxious component of the gas and the liquid electrolyte thereby detoxifying the gas and means for venting the detoxified gas to the atmosphere.

SPECIFIC DESCRIPTION AND EXAMPLES

Figure 1:
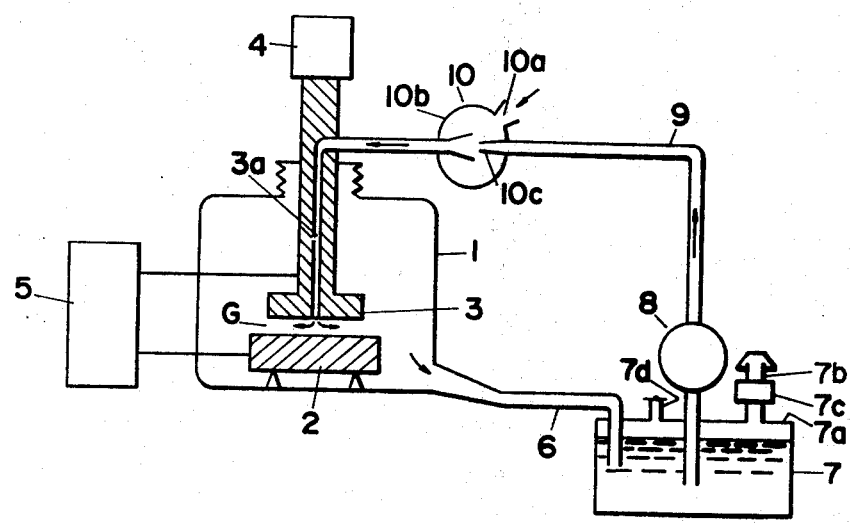
FIG. 1 is a schematic view of a waste gas treatment apparatus embodying the present invention.

Referring now to FIG. 1, the apparatus shown comprises a treatment vessel 1 sealed hermetically from the atmosphere and receiving therein a pair of and 2 andd 3 which are juxtaposed with one another to form an electrochemical reaction treatment gap G therebetween. One of the electrodes 2 is here fixedly mounted on the bottom of the vessel 1 while the other electrode 3 is adapted to be movable by a positioning device 4 relative to the fixed electrode 2. The positioning device 4 is designed to set the gap G at a small size, say less than 5 mm, preferably between 1 microns and 0.1 mm and to maintain the set gap during a treatment operation. Connected across the electrodes 2 and 3 is a unit 5 containing a power supply and control device adapted to apply an electrolyzing current between the treatment gap G. The treatment vessel 1 communicates via an output pipe 6 with a reservoir 7 containing a liquid electrolyte which is drawn by a pump 8 and passed into the gap G via a supply line 9 and a channel 3a formed through the electrode 2 and opening to the gap G. Provided in the supply path of the liquid electrolyte 9 is a gas injector device 10 which as diagrammatically shown comprises a waste gas inlet port 10a, a plenum chamber 10b and a Venturi nozzle 10c so that the waste gas introduced into the plenum 10b via the inlet 10a joins at the Venturi nozzle 10c the electrolyte stream and is entrained thereby in the form of minute bubbles, the homogeneous gas/electrolyte mixture being fed to the reaction gap G between the electrodes 2 and 3. It will be understood that this gas injector may be either of the compressor or aspirator type of well known construction.

In general, the electrodes 2 and 3 or at least the one which is poled anodic should preferably be composed of an electrolysis-dissolution-resistant electrode material such as platinum, carbon, stainless steel, lead or the like; it is also possible to make use of electrodes formed with a coating composed of one of these materials. However, the positioning device 4 makes it possible to compose the anode of an electrolytically dissolvable metal such as aluminum or iron where the production of a hydroxide of such a metal serving as a gas contaminant absorbing and detoxifying agent is desired. In this instance, means are provided responsive to a signal indicative of change in the gap size, e.g. change in gap resistance for advancing the movable electrode 3 so as to compensate for the change thereby maintaining the gap size at a preset value in the course of treatment operation. The size of the treatment gap G is advantageously maintained in a range as mentioned previously, this being on one hand to minimize the loss of electric power thereby insuring the delivery of a high amperage electric current at a low voltage and on the other hand to enable the liquid/gas stream to pass at an increased velocity between the opposed surfaces of the electrodes 2 and 3. Owing to this promoted fluid flow, the electrode surfaces are effectively prevented from adhesion and accumulation of electrochemical reaction products and contaminants and thus held in an optimum state to continuously bring about high current electrochemical reactions.

The liquid electrolyte, in addition to a good electric conductivity, needs to have a constituent adsorptive of and thus reactive with gaseous components of interest. Thus, the liquid should generally contain a conductivity-imparting element (electrolyte), water which electrochemically decomposes into hydrogen and oxygen which are reactive with gaseous components the electrolyte having a high adsorptivity of either or both of oxidized or reduced gaseous components and may further incorporate oil particles which have surface charges for adsorptivity and divide the electric field, and/or particles of any one or more of activated carbon, activated white clay and ion-exchange resins which are of selective adsorptivity for various contaminants.

A particular composition of the treatment liquid to be supplied into the vessel 1 is thus determined taking into account the particular noxious components of the gas which is mixed with the liquid at an injector 10. The liquid/gas mixing ratio (volume) is selected as optimum at a value from the range, say 1/1 to 1/1000, calculated at atmospheric pressure, by operating the adjustment valve (not shown) at the gas inlet port 10a or controlling the electrolyte delivery pressure of the pump 8. The noxious gas is effectively entrained in the stream of liquid electrolyte in the form of minute bubbles uniformly distributed therein and also in part is dissolved, and the liquid/gas stream is caused to flow through the gap G at a high velocity in the range, say 1 to 10 meters/second. The application of an electric current from the power supply unit 5 brings about high-energy electrochemical reactions at interfaces between the liquid and gas bubbles in the stream traversing the gap G rapidly.

For example, when the waste gas contains sulfur dioxide ($SO_2$) to be removed, the treatment liquid may be an aqueous solution of sodium hydroxide (NaOH) which is reactive with $SO_2$ to form sodium sulfite $Na_2SO_3$ which in turn is oxidized to sodium sulfate $Na_2SO_4$. By having incorporated lime slurry $Ca(OH)_2$ in the reservoir 7, the sulfate is recovered in the latter in the form of suspended $CaSO_4$ which can be readily separated from the sodium hydroxide aqueous solution while this latter solution can be recycled.

When the waste gas contains nitrogen oxides (NOx), nitrogen dioxide ($NO_2$) is inherently readily dissolved into sodium hydroxide (NaOH) and sodium sulfite ($Na_2SO_3$). Although nitrogen monoxide (NO) is only slightly dissolved in either of these liquid constituents, it undergoes a strong electrochemical oxidation reaction when the liquid containing it is passed through the gap G to reform it into nitrogen dioxide ($NO_2$) which in turn is soluble in the liquid. Also, because chloride is present in the liquid, the following oxidation reaction takes place electrochemically: $NO + OCl^- \rightarrow NO_2 + Cl^-$ and the resulting nitrogen dioxide is dissolved in the liquid. These are both anodic reactions. At the cathode, $NO + H_2 \rightarrow NH_3$. The above chlorine upon discharge at the anode would react with sodium hydroxide (NaOH) to form NaClO which acts to oxidize nitrogen monoxide (NO) to form nitrogen dioxide ($NO_2$) and sodium chloride (NaCl). The dissolved nitrogen dioxide $NO_2$ is reduced by ammonium ($NH_3$) or hydrogen ($H_2$) dissolved in the liquid and is then vented as nitrogen gas.

Besides these electrochemical reactions, reactions due to the action of electric discharges at the gas/liquid interfaces also take place. It has been determined that an electric discharge is generated at such an interface when the electric field Es intensity exceeds the critical value $Eso=5\times(1/k)^{1/3}\times10^2$ volts/cm where $k$ is the electrical conductivity of the region and gives rise to decomposition, oxidation and reduction of gaseous components as follows: $NOx \rightarrow N_2 + O_2; H_2O \rightarrow OH, H_2O_2, H_2O^+ \ldots ; NO + OH, H_2O_2, H_2O^+ \ldots \rightarrow NO_2 + \ldots$ Accordingly, synergistic effects due, both to electrochemical actions and to electric discharge are obtained.

Similarly, numerous other kinds of noxious components can be treated. For example, waste gases containing hydrogen sulfide, mercaptan, hydrogen arsenide, amines, ammonium, oil fumes and the like deodorized contaminants, are deodorized by using as the treatment liquid electrolyte an aqueous solution of sodium hydroxide, sodium sulfite, cuprous sulfide, cupric sulfide, hydrogen chloride, cuprous chloride, cupric chloride, ferrous chloride and ferric chloride singly or in a suitable combination.

The reservoir 7 has a sealed cover 7a to collect the detoxified gas released from the liquid and is provided with an exist duct 7b for venting the gas to the atmosphere. In the duct 7b, a secondary treatment arrangement 7c such as a dehumidifier may be provided as desired. The reservoir 7 is also provided with a treatment liquid supply inlet 7d.

The treatment liquid can be utilized consecutively by recycling it through the supply and exhaust lines 9 and 6 coupling the treatment vessel 1 and the reservoir 7 in a closed system. Such consective use may, however, cause deterioration of its composition. Although the treatment efficiency can, of course, be recovered by addition of an amount of the fresh liquid from time to time, it has been found that such restoration can be obtained in the reservoir 7 by electrochemical means as will be described.

Figure 2:
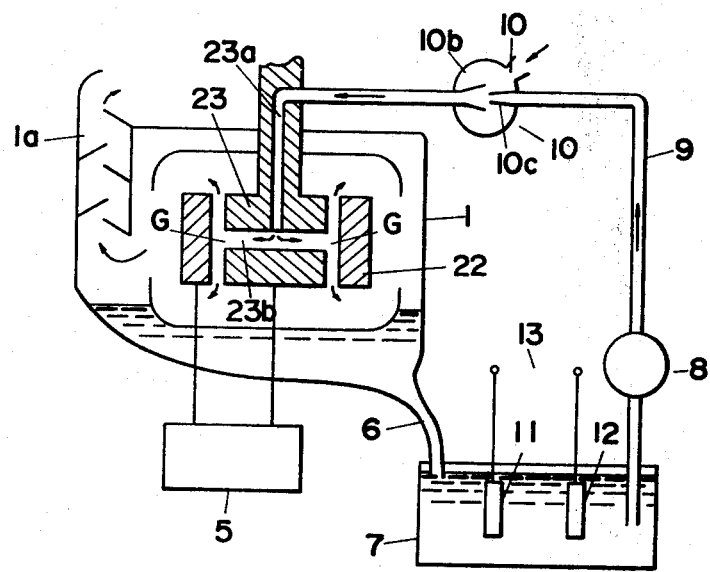
FIG. 2 is a similar view of another embodiment of the invention which is particular suitable and designed for deodorising a waste gas containing odoriferous contaminants.

In the embodiment of FIG. 2 in which the same or similar parts are indicated by identical reference designations to those in FIG. 1, a pair of electrodes 11 and 12 are provided in the reservoir 7 as juxtaposed with one another and arranged for energization by a power supply 13 which is essentially a direct current source poled to make one of the electrodes 11 and 12 anodic and the other cathodic. This electrode arrangement is designed to supply, by electrolytic dissolution of the anodic electrode material, a particular electrolyte required as an active constituent of the treatment liquid and thus to restore or maintain the concentration of such constituent at a desired level.

Further, in the embodiment of FIG. 2, one of the electrodes 22 is of tubular shape instead of the disk shape of FIG. 1 and is arranged to surround the counterelectrode 23 which is of columnar shape having a fluid (gas/liquid mixture) inlet central bore 23a (like that of FIG. 1) and a plurality of radially extending apertures 23b communicating the central bore with a treatment gap G formed between the inner cylindrical surface of the first electrode 22 and the outer cylindrical surface of the second electrode 23. The clarified gas is separated from the liquid in the vessel 1 and is vented to the atmosphere via a ducting 1a.

EXAMPLE I

With an apparatus essentially as shown in FIG. 2, a waste air containing hydrogen sulfide of 0.06 % and ammonium of 0.02 % was treated using an aqueous solution of cuprous chloride. The air was introduced through the port 10a at a flow rate of 1000 liters/min and mixed with the liquid from the nozzle 10c, the mixture being passed at a flow rate of 2000 liters/min. through the gap G across which an electric current of 200 amperes was applied at a voltage of 15 volts. The air emitted from the exit duct 1a had no odor.

After 3 weeks of consecutive operation, a drop in the activity of the liquid was observed, and a direct current of 100 amperes at 8 volts was applied from the source 13 between the electrodes 11 and 12 which were composed of copper. After 2 hours, the original activity of the treatment liquid was restored.

EXAMPLE II

With an apparatus essentially shown in FIG. 1, a waste air containing 55 ppm of sulfur dioxide and 15 ppm of cabon monoxide was treated using an aqueous solution containing 5 % of sodium hydroxide. The gas was mixed with the liquid at a volume ratio of 20/1 as calculated at a pressure of one atmosphere, the mixture being passed under a pressure of 5.2 kg/cm$^2$ into the gap G across which an electric current of 250 amperes was applied at 16 volts. The gas released from the treatment liquid (as collected in the closed space above the liquid level in the reservoir 7) had only 1.6 ppm sulfur dioxide and 0.2 ppm of carbon monoxide.

In the arrangement of FIG. 2 it will be apparent that a reservoir 7 separate from the treatment vessel 1 is not essential and the liquid collected in the treament vessel 1 can be drawn by the pump 8 directly to circulate into the treatment gap G without storage in a separate tank thereby making the entire equipment as compact as desired.

From the foregoing description, it will be appreciated that the present invention has significant advantages which can be summarized: 1) owing to the fact that electrochemical actions in a high-energy-density field are utilized, reaction rates much higher than with conventional chemical processes are achieved permitting the equipment to be much compact compared with those existing and the installation less costly; 2) the need for a large volume of treatment liquid is eliminated making the operation economical; 3) the effective use of liquid/gas mixture of a very low liquid/gas volume ratio further contributes to making the equipment compact; 4) reaction liquid products are simple compounds which are easy to recover and 5) the process can be practiced in a closed system with less tendency to produce secondary pollution.

In accordance with another aspect of the present invention, there is provided an improved electrochemical machining (ECM) system incorporating the principles described, to contribute to anti-pollution as arising from the operation of conventional ECM equipment and also to save machining liquid (electrolyte).

In typical ECM operations, the machining liquid is an aqueous solution of electrolyte such as sodium chloride, sodium nitrate, potassium nitrate and sodium chlorate. As a result, large quantities of gases such as $Cl_2$ and $NH_3$ which are detrimental to the human health are generated at the machining gap and contaminate the environment in which the machine operates. Furthermore, as a consequent of extraction of these components, the machining liquid deteriorates in machining activity, necessitating replenishment of fresh electrolyte from time to time. Also, the above pollution problem could only be solved in the past by provision of a conventional air clarifier which involves consumption of additional materials. These inconvenience and disadvantages are overcome in accordance with the present invention.

Figure 3:
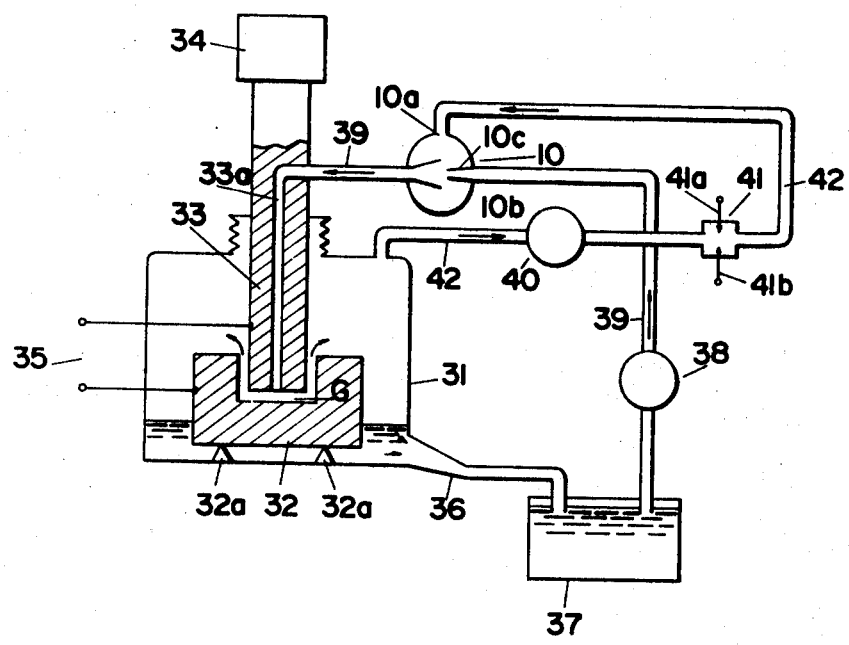
FIG. 3 is a schematic view of an improved, anti-pollution, high-efficiency electrochemical machining system embodying the principles of the present invention.

Referring to FIG. 3 which illustrates the improved ECM system, a work chamber 31 is shown tightly sealed from the ambient atmosphere. Received in the chamber 31 is a workpiece 32 fixedly mounted upon a table 32a diagrammatically shown and a movable ECM electrode 33 spacedly juxtaposed with the workpiece 32 across a narrow machining gap G in the usual manner. An electrode feed mechanism 34 is provided to advance the electrode 33 as the machining of the workpiece 32 proceeds to maintain the size of the gap G substantially constant. A machining power supply of known type is shown at 35 connected across the workpiece 32 and the electrode 33. The machining liquid (electrolyte) flushed from the machining gap is collected at the bottom of the work chamber 31 and drained to a reservoir 37 via an outlet duct 36. The machining liquid in the reservoir 37 is drawn by a pump 38 and forced toward the machining gap G along a feed conduit 39 which is provided on its path with a gas mixing device 10 of configuration already noted. The gas inlet port 10a communicates with the work chamber 31 via a compressor 40 adapted to draw the ECM exhaust gas from the work chamber 31 and an electric discharge device 41 comprising a pair of electrodes 41a and 41b. The discharge device 41 here is an optional means to be provided depending on the type of component of the ECM gas and designed to bring about oxidation, reduction and/or decomposition reactions of the exhaust under the action of a glow-type electric discharge. The gas mixer 10 shown here is of the compressor type but may be replaced by the aspirator type. The discharge device 41 in the illustrated embodiment is provided downstream of the compressor 40 but may alternatively be disposed upstream of the latter.

The machining liquid electrolyte, having gases entrained therein at the mixing device 10, is forced at a high velocity into the machining gap G via a bore 33a formed through the machining electrode 33, the gases on one hand facilitating the electrochemical machining of the workpiece 32 to increase its machining accuracy and surface quality and on the other hand increasing the machining activity of the liquid electrolyte as will be described. The liquid phase past the machining gap G is separated in the work chamber 31 from the gas phase being exhausted by the compressor 40 to the mixing device 10 along the conduit 42, is returned to the reservoir 37 and again drawn by the pump 38 and forced toward the machining gap G past the mixing device 10 where it joins the exhaust gas drawn from the chamber 31 as already mentioned.

With reference to typical ECM operations where the machining liquid is an aqueous solution of nitrate such as sodium nitrate $NaNO_3$ or potassium nitrate $KNO_3$, an explanation will now be given of the process of this improved system. With the progress of machining, a gradual drop in machining activity of the liquid generally takes place in the form of electrolytic decomposition of the dissolved nitrate into ammonium $NH_3$ and other gaseous products including $N_2$, $O_2$ and $H_2O$ which are emitted from the machining gap G. In this system, these gases collected in the chamber 31 are exhausted past the discharge stage 41 where they are exposed, to a glow discharge. In the glow discharge zone, ammonia ($NH_3$) and nitrogen ($N_2$) gases can in the presence of $O_2$ and $H_2O$ be oxidized to form nitrogen oxides (NOx). To promote these reactions, the discharge electrodes can be composed of catalytic metal such as platinum or iron. These reformed gases are injected in the plenum 10b in the mixer 10 and join the stream of liquid electrolyte issuing from the nozzle 10c to form the stream of an homogeneous gas/liquid mixture which is pumped along the duct 39 into the machining gap G. Of these gases, nitrogen dioxide ($NO_2$), nitrogen trioxide ($NO_3$), hydrogen $H_2$, oxygen $O_2$ and water vapor are by their nature readily dissolved or absorbed in the liquid electrolyte (e.g. sodium hydroxide (NaOH) while such components as nitrogen monoxide (NO) not readily solubilizable would exist in the form of bubbles distributed in the liquid. In the machining gap G there occurs a strong oxidation reaction whereby nitrogen monoxide (NO) is reformed into nitrogen dioxide which is absorbed in the liquid electrolyte. Also, because a chloride is present in the liquid, nitrogen monoxide reacts with NaOCl to form nitrogen dioxide and chloride ion, the latter being oxidized at the anode to form neutral chlorine which reacts with sodium hydroxide to form more sodium hypochlorite, the latter reacting with nitrogen monoxide to form nitrogen dioxide. In this manner, nitrogen monoxide is completely absorbed and by this absorption process the waste machining liquid maintains its machining activity.

For example, an electrochemical machining equipment used to machine ferrous workpieces with a machining current of 3000 amperes and an aqueous solution of sodium nitrate, according to the conventional practice, necessitated replenishment of 20 liters of 40 % by weight of nitric acid solution in one month. When the closed system according to the invention as described in the foregoing is employed, no such replenishment is required.

It should also be noted that the use of a gas admixed electrolyte here has a further advantage from consideration of machining performance in that it insures a high quality and precision machined surface by eliminating the cavitation effect in the machining gap. Compressed gas bubbles expand and vary their volume according to local liquid pressure distribution in the machining gap and thus effectively eliminate cavitations which would create irregularly machined surfaces.

As described hereinbefore, the present invention provides an improved method whereby waste gases can be treated reliably and efficiently as well as an anti-pollution, economical ECM system incorporating the improvement.

What is claimed is:

1. A method of treating a waste gas containing a noxious gas component comprising the steps of:
   a. electrochemically forming in situ by electrolysis of a liquid electrolyte, a reactant capable of undergoing an oxidation-reduction reaction to detoxify the noxious gas component of the waste gas;
   b. injecting the waste gas into a stream of the liquid electrolyte; and
   c. rapidly passng the liquid electrolyte entraining the waste gas therein through a narrow gap between a pair of electrodes while passing an electric current between said electrodes to effect an electrochemical reaction between said noxious gas component of said waste gas and the liquid electrolyte to detoxify said waste gas.

2. A method as defined in claim 1, wherein one of said electrodes is fixed and the other is movable, further comprising positioning said movable electrode apart from said fixed electrode at a distance between 0.001 and 0.1 mm.

3. A method as defined in claim 2, further comprising the step of venting the detoxified gas to the atmosphere while collecting the waste liquid separated from said gas.

4. A method as defined in claim 3, further comprising the step of recycling the liquid separated from said detoxified gas.

5. A method defined in claim 2 wherein one of the electrodes is a tool electrode in an electrochemical machining system and the other is a workpiece machined thereby, said electrolyte being an electrochemical machining liquid and said electric current being an electrochemical machining current.

6. A method as defined in claim 2 wherein at least one of said electrodes is poled anodic and is composed of a material selected from the class consisting of platinum, carbon, stainless steel and lead.

7. A method as defined in claim 2 wherein at least one of said electrodes is poled anodic and has a coating composed of a material selected from the class consisting of platinum, carbon, stainless steel and lead.

8. A method as defined in claim 2 wherein one of said electrodes is poled anodic and is composed of an electrolytically dissolvable metal capable of producing a hydride thereof serving as a gas contaminant absorbing and detoxifying agent, said method further comprising the step of relatively advancing one of said electrodes toward the other to maintain the gap spacing therebetween substantially constant in said range.

9. The method defined in claim 1 wherein the noxious gas component of the waste gas consists essentially of nitric oxide and the liquid electrolyte is an aqueous solution of sodium hypochlorite formed by the reaction of anodic chlorine with sodium hydroxide and the noxious nitric oxide components of the waste gas is oxidized to nitrogen dioxide.

10. A method of treating a waste gas containing nitric oxide as a noxious gas component comprising the steps of:
   a. electrochemically forming in situ by electrolysis of a chloride ion-containing liquid electrolyte, a hypochlorite ion-containing reactant capable of undergoing an oxidation-reduction reaction to detoxify the nitric oxide noxious gas component of the waste gas;
   b. injecting the nitric oxid-containing waste gas into a stream of the liquid electrolyte containing the hypochlorite ion; and
   c. rapidly passing the liquid electrolyte containing the hypochlorite ion and entraining the waste gas containing the nitric oxide as the noxious component through a narrow gap between a pair of electrodes while passing an electric current between said electrodes to effect an electrochemical reaction between said nitric oxide and said hypochlorite ion to form nitrogen dioxide thereby detoxifying the waste gas.

* * * * *